No. 866,736. PATENTED SEPT. 24, 1907.
J. C. S. & H. R. RUMSEY.
SCOOP.
APPLICATION FILED MAY 7, 1907.

Witnesses
Edwin L Bradford
L. O. Little

Inventors
John C. S. Rumsey
Herbert R. Rumsey
By Watson E. Coleman Attorney

THE NORRIS PETERS CO., WASHINGTON, D. C.

UNITED STATES PATENT OFFICE.

JOHN C. S. RUMSEY AND HERBERT R. RUMSEY, OF VINLAND, KANSAS.

SCOOP.

No. 866,736.  Specification of Letters Patent.  Patented Sept. 24, 1907.

Application filed May 7, 1907. Serial No. 372,294.

*To all whom it may concern:*

Be it known that we, JOHN C. S. RUMSEY and HERBERT R. RUMSEY, citizens of the United States, residing at Vinland, in the county of Douglas and State of Kansas, have invented certain new and useful Improvements in Scoops, of which the following is a specification, reference being had therein to the accompanying drawing.

Our invention relates to improvements in scoops or devices for gathering manure, litter, trash and the like.

The object of the invention is to provide a device of this character of simple, strong, durable and inexpensive construction which may be conveniently and effectively used for various purposes about the farm.

Figure 1:
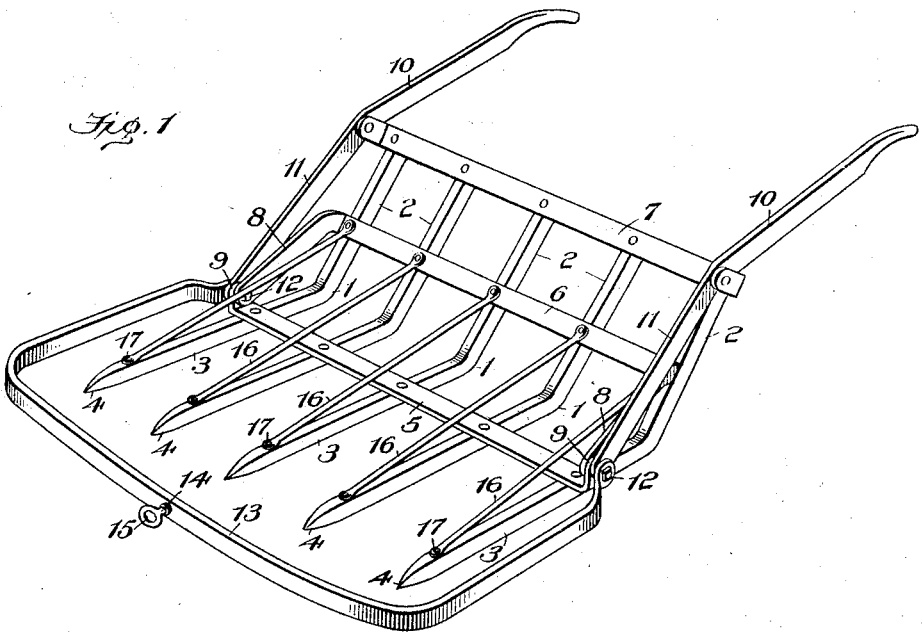
Figure 2:
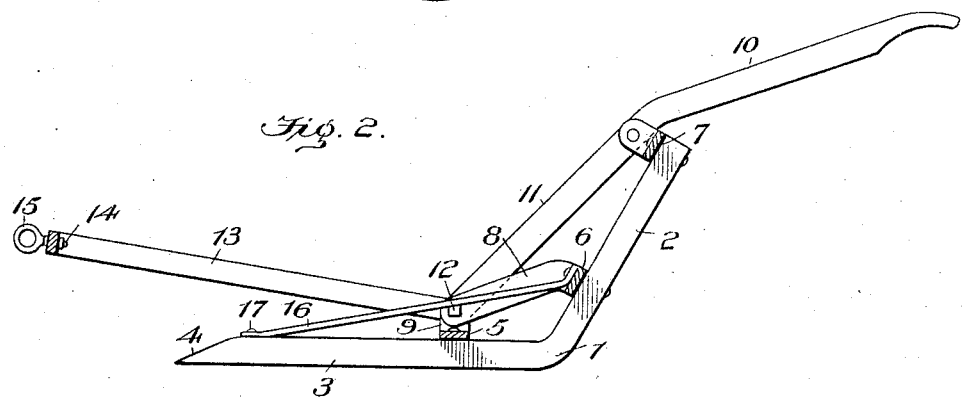
Figure 3:
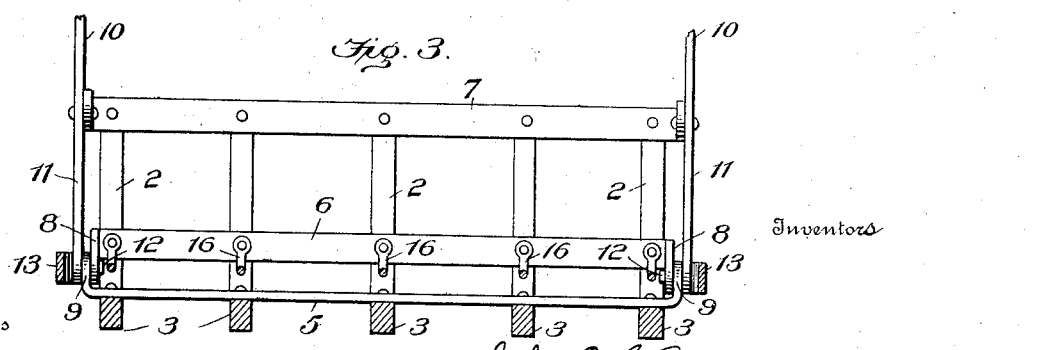

With the above and other objects in view the invention consists in the novel features of construction and the combination and arrangement of parts hereinafter described and claimed, and illustrated in the accompanying drawings, in which Figure 1 is a perspective view of our improved scoop; and Figs. 2 and 3 are longitudinal and transverse sectional views.

Our improved scoop consists of a plurality of parallel finger bars 1 of metal and preferably of rectangular shape in cross section. These bars are bent at points adjacent to their rear ends so as to form vertically or upwardly and rearwardly inclined portions 2 and horizontal portions 3, the front ends of which are tapered to provide teeth or points 4. The finger bars 1 are connected together and spaced apart by three cross bars 5, 6, 7. The lower and foremost bar 5 is arranged upon the tops of and riveted or otherwise secured to the horizontal portions 3 of the finger bars at a suitable distance from their angularly bent rear ends. While the bars 6, 7 are similarly secured to the upright portions 2 of the finger bars, as clearly shown in Fig. 1. The intermediate cross bar 6 is of greater length than the others and its ends are bent at right angles to form forwardly and downwardly inclined braces 8 which have their ends engaged with the upwardly bent ends 9 of the front or lowermost cross bar. The uppermost or rearmost cross-bar 7 has its projecting ends bent at right angles and secured to handle bars 10 which have portions extending rearwardly and formed with hand grips and portions 11 extending downwardly and forwardly to provide braces. The braces 8, 11 and the bent ends 9 of the cross bar 5 are secured together by bolts or similar fastenings 12 which latter also serve as pivots for a rectangular loop or bail 13 to which a draft animal or team may be hitched for the purpose of dragging the scoop over the ground. This pivotal connection of the bail 13 permits it to have swinging movement and also permits the scoop to be turned over and dumped by swinging its rear end upwardly and forwardly, as will be readily understood. At the center of the front or cross portion of the bail 13 is connected by a swivel 14 an eye or ring 15 to which the draft connections may be attached. For the purpose of bracing the back portion of the scoop and also for the purpose of elevating the material gathered by the scoop and thus lifting or assisting it over the front cross bar 5, I provide a plurality of upwardly and rearwardly inclined rods 16 which have their front ends secured at 17 to the front ends of the tooth or finger bars 1 and their rear ends connected to the upright portions 2 of said bars and the intermediate cross bar 6 by the same fastenings which secure said cross bar to the finger bars, as clearly shown in Fig. 2. It will be noted that the rods 16 serve to effectively brace the bottom and back portions of the scoop and that they also serve to elevate the manure, straw, litter and other trash gathered by the scoop and assist it over the cross bar 5 and upon the rear or back portion of the scoop. The provision of these inclined brace and guide rods 16 materially increases the efficiency of the scoop, since without them the material gathered by it would be stopped by the front cross bar 5 and the scoop would be permitted to pick up but a small load.

From the foregoing description taken in connection with the accompanying drawings it is thought that the construction, use and advantages of the invention will be readily understood without a more extended explanation.

Having thus described my invention what I claim and desire to secure by Letters Patent is:—

1. A scoop of the character described comprising angular finger bars, cross bars connecting the same, handle bars uniting said cross bars and forming braces and a draft connection attached to one of said cross bars.

2. A scoop of the character described comprising finger bars having horizontal portions and upright rear portions, a cross bar uniting said horizontal portions, a cross bar uniting said upright portions and having its ends extended forwardly and downwardly to form inclined braces and fastenings uniting the latter to the first mentioned cross bar.

3. A scoop of the character described comprising finger bars having horizontal portions and upright rear portions, a cross bar uniting said horizontal portions, a cross bar uniting said upright portions and having its ends extended forwardly and downwardly to form inclined braces, a third cross bar uniting said upright portions and arranged above the second cross bar, handle bars secured to said third cross bar and having their forward ends extending forwardly and downwardly to provide braces and fastenings for securing the braces formed by said handle bars and said second cross bar to the first mentioned cross bar.

4. A scoop of the character described comprising finger bars having horizontal portions and upright rear portions, a cross bar uniting said horizontal portions, a cross bar uniting said upright portions and having its ends extended forwardly and downwardly to form inclined braces, a third cross bar uniting said upright portions and arranged above the second cross bar, handle bars secured to said third cross bar and having their forward ends extending forwardly and downwardly to provide braces, a draft loop or bail and fastenings for connecting the latter, the ends of the first mentioned cross bar and the braces formed by the handle bars and the second mentioned cross bar.

5. A scoop of the character described comprising a back portion and a bottom portion, the latter being composed of parallel finger bars, a cross bar arranged upon and secured to the tops of said finger bars and upwardly and rearwardly inclined brace and guide rods between the back portion of the scoop and the front portions of said finger bars, substantially as and for the purpose specified.

6. A scoop of the character described comprising angular finger bars united by cross bars, one of said cross bars being arranged upon the tops of the front portions of the finger bars and upwardly and rearwardly inclined brace and guide rods between the front and rear portions of the finger bars and disposed above the last mentioned cross bar, substantially as and for the purpose specified.

In testimony whereof we hereunto affix our signatures in presence of two witnesses.

JOHN C. S. RUMSEY.
HERBERT R. RUMSEY.

Witnesses:
H. N. WOODS,
J. W. JUNKINS.